United States Patent
Boehm et al.

(10) Patent No.: US 12,353,725 B2
(45) Date of Patent: Jul. 8, 2025

(54) VERIFICATION OF A VOLATILE MEMORY USING A UNIQUE IDENTIFIER

(71) Applicant: Micron Technology, Inc., Boise, ID (US)

(72) Inventors: Aaron Boehm, Boise, ID (US); Jeremy Chritz, Seattle, WA (US); David Hulton, Seattle, WA (US); Tamara Schmitz, Scotts Valley, CA (US); Max Vohra, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 242 days.

(21) Appl. No.: 17/694,355

(22) Filed: Mar. 14, 2022

(65) Prior Publication Data
US 2023/0205430 A1    Jun. 29, 2023

Related U.S. Application Data

(60) Provisional application No. 63/294,167, filed on Dec. 28, 2021.

(51) Int. Cl.
*G06F 3/06* (2006.01)
*G06F 12/14* (2006.01)

(52) U.S. Cl.
CPC .......... *G06F 3/0619* (2013.01); *G06F 3/0659* (2013.01); *G06F 3/0679* (2013.01); *G06F 12/14* (2013.01)

(58) Field of Classification Search
CPC .... G06F 3/0619; G06F 3/0659; G06F 3/0679; G06F 21/64; G06F 12/14
See application file for complete search history.

(56) References Cited

U.S. PATENT DOCUMENTS

| | | | |
|---|---|---|---|
| 2009/0187770 A1* | 7/2009 | Cao | H04L 9/3271 713/193 |
| 2010/0257602 A1* | 10/2010 | Kettler | G06F 9/45558 718/1 |
| 2014/0082724 A1* | 3/2014 | Pearson | G06F 3/0625 726/22 |
| 2015/0301754 A1* | 10/2015 | Kochar | G06F 3/0679 711/103 |
| 2020/0244458 A1* | 7/2020 | Kanbe | G06F 3/0637 |
| 2020/0401533 A1* | 12/2020 | Golov | G06F 12/1408 |
| 2021/0224201 A1* | 7/2021 | Sandberg | H04L 9/3242 |
| 2022/0012187 A1* | 1/2022 | Contreras Munoz | G06F 21/44 |

* cited by examiner

*Primary Examiner* — Kalpit Parikh
(74) *Attorney, Agent, or Firm* — Holland & Hart LLP

(57) ABSTRACT

Methods, systems, and devices for verification of a volatile memory, such as a dynamic random-access memory (DRAM), using a unique identifier (ID) are described. A memory device may store a unique ID for a DRAM component of the memory device in non-volatile memory (e.g., in the DRAM, external to the DRAM). A host device coupled with the memory device may store, to non-volatile memory at the host device, information for verifying the identity of the DRAM component, for example, based on the unique ID. The memory device and host device may perform a procedure for verification of the identity of the DRAM component using the unique ID of the DRAM and the verification information stored at the host device. If the host device detects that the DRAM has been replaced or modified based on the verification procedure, the host device may disable one or more features of the memory device.

31 Claims, 8 Drawing Sheets

VERIFICATION OF A VOLATILE MEMORY USING A UNIQUE IDENTIFIER

CROSS REFERENCE

The present application for patent claims the benefit of U.S. Provisional Patent Application No. 63/294,167 by BOEHM et al., entitled "VERIFICATION OF A VOLATILE MEMORY USING A UNIQUE IDENTIFIER," filed Dec. 28, 2021, assigned to the assignee hereof, and expressly incorporated by reference herein.

FIELD OF TECHNOLOGY

The following relates generally to one or more systems for memory and more specifically to verification of a volatile memory, such as a dynamic random-access memory (DRAM), using a unique identifier (ID).

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
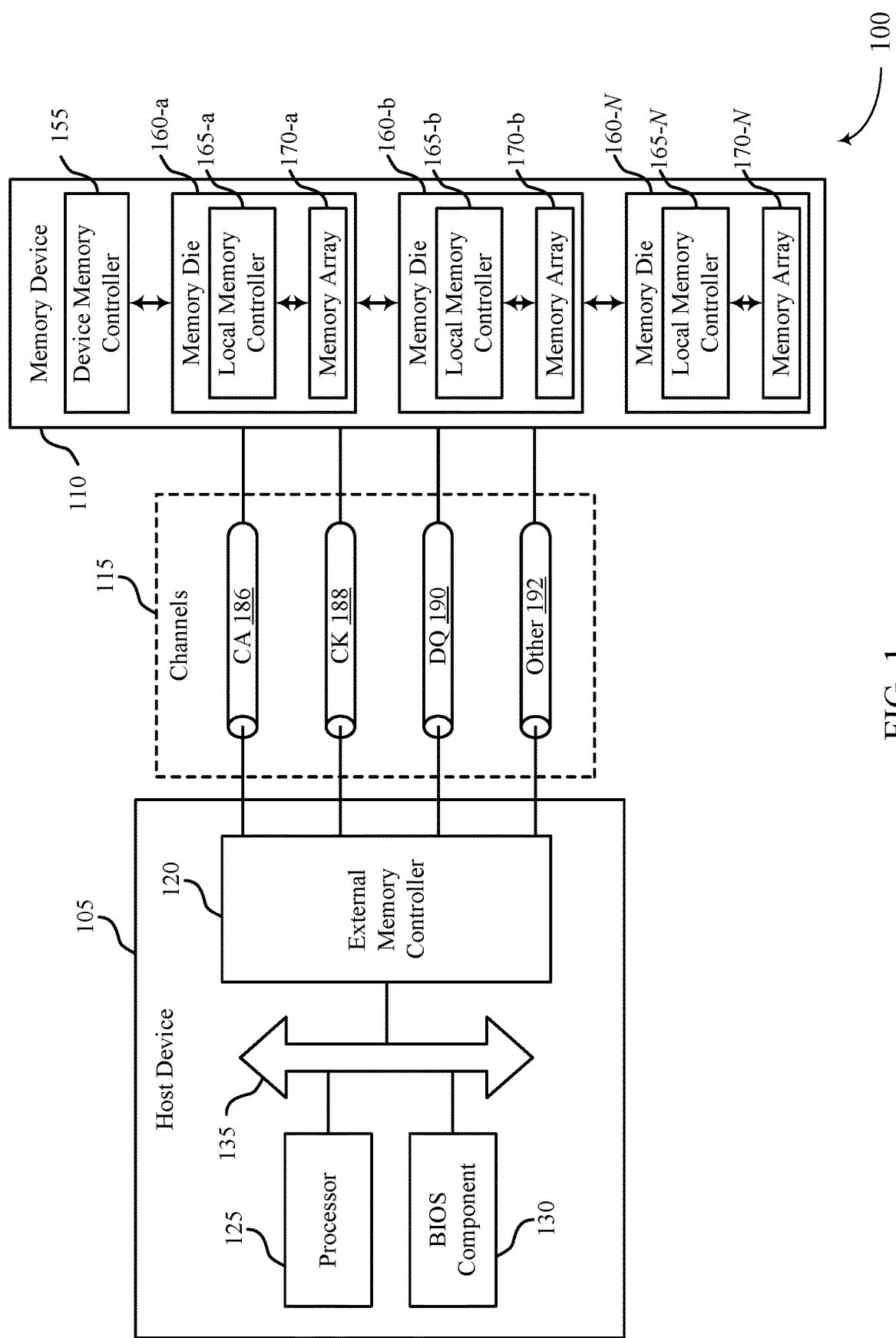
FIG. 1 illustrates an example of a system that supports verification of a volatile memory, such as a dynamic random-access memory (DRAM), using a unique identifier (ID) in accordance with examples as disclosed herein.

A system, such as an automotive system (e.g., a vehicle), may include a host device coupled with a memory device. The host device and the memory device may communicate information (e.g., commands, data) using signaling over one or more channels between the host device and the memory device. In some cases, an attack on the memory device may affect one or more channel characteristics between the memory device and the host device. For example, modifying a printed circuit board (PCB) at the memory device (e.g., by adding an interposer, modifying cabling, modifying a socket, or some combination thereof) may change a characteristic of the one or more channels between the memory device and the host device. Additionally or alternatively, removing the memory device or a component of the memory device (e.g., a dynamic random access memory (DRAM)) from the system may change a characteristic of the one or more channels between the host device and the memory device or the component of the memory device. In some examples, an unauthorized user (e.g., a hacker, a customer) may remove the memory device, such as the DRAM, or otherwise modify the memory device to capture secure communications or read secure information, among other examples, from the memory device, such as the DRAM. Detecting such an attack, before the attack occurs or even as the attack occurs, may allow the host device and the memory device to perform operations to mitigate the theft of secure or other information and prevent future theft of secure or other information.

As described herein, a system may support one or more techniques for using a verification procedure and a unique identifier (ID) for a volatile memory, such as a DRAM, to detect a memory device attack. A memory device may store a unique ID for a volatile memory, such as a DRAM, in non-volatile memory. For example, the memory device may be programmed with the unique ID, for example, may be programmed with a unique ID to a set of fuses (e.g., fuse elements) at the DRAM, may store (e.g., write) the unique ID to a set of non-volatile memory cells at the DRAM, or may store the unique ID at other memory, such as non-volatile memory, of the memory device. Additionally, the memory device may transmit signaling indicating the unique ID for the volatile memory, such as the DRAM, to a host device coupled with the memory device. The host device may store verification information for the volatile memory, such as the DRAM, in non-volatile memory at the host device based on the unique ID. The host device and memory device may perform a verification procedure using the verification information (e.g., at the host device) and the unique ID (e.g., at the memory device) based on a trigger (e.g., a specific event, such as boot up, a verification periodicity or schedule, or some other trigger event). For example, the host device may receive and check the unique ID for the volatile memory, such as the DRAM, against the verification information to ensure the DRAM has not been removed and replaced. Additionally or alternatively, the host device or the memory device (or both) may check for other changes associated with the volatile memory, such as the DRAM, during a verification procedure to detect any modifications to the volatile memory, such as the DRAM, or the memory device more broadly that may indicate an attack was performed on the volatile memory, such as the DRAM. If the verification procedure determines a change to the volatile memory, such as the DRAM, or the memory device more broadly, such as the volatile memory being replaced with a different volatile memory corresponding to a different unique ID, the host device or the memory device or both may disable one or more features of the memory device in order to protect information at the memory device from attack.

Features of the disclosure are initially described in the context of systems and dies as described with reference to FIGS. 1 through 3. Features of the disclosure are further described in the context of a process flow as described with reference to FIG. 4. These and other features of the disclosure are further illustrated by and described with reference to apparatus diagrams and flowcharts that relate to verification of a DRAM using a unique ID as described with reference to FIGS. 5 through 8.

FIG. 1 illustrates an example of a system 100 that supports verification of a volatile memory, such as a DRAM, using a unique ID in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. The channels 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, the system 100 may be an example of an automotive system (e.g., a vehicle). For example, the host device 105 and the memory device 110 may both be components of a vehicle, and the host device 105, the memory device 110, or both may be further coupled with other components of the vehicle. In some cases, a system 100 may be susceptible to attacks from hackers or other users. For example, a user (e.g., a hacker) may probe a memory device 110, such as a DRAM bus or another type of memory device or component, to determine information from the memory device 110. In this way, the user may gain access to secure information or components (e.g., firmware, keys, plaintext data) of the memory device 110 that is intended to be hidden from or inaccessible to the user. Secure information may be information stored at a device (e.g., a vehicle) or information communicated in an ecosystem (e.g., between the vehicle and other devices or cloud components). In some cases, a user may manipulate information at the vehicle or manipulate communication information to trigger specific responses, access specific data, or cause other responses at the memory device 110. Secure information may be especially susceptible while a memory device 110 is in an idle state (e.g., operating in a relatively low power mode), which may occur in some vehicle situations, such as when the vehicle is idle for a given duration. Some memory devices 110, such as low-power double data rate (LPDDR) DRAM memory devices, may remain in an idle state for significant periods of time (e.g., days, weeks), during which a user (e.g., a hacker) may attempt to retrieve information (e.g., information that should be otherwise restricted from the user) from the memory device 110. Some vehicle systems may utilize LPDDR DRAM memory for improved power efficiency, but the LPDDR DRAM memory may be potentially susceptible to attacks while the vehicle is parked.

A user (e.g., a hacker) may perform one or more different types of attacks to try to access secure information at a memory device 110. In a first example, the user may physically remove the memory device 110 or a portion of the memory device 110 from the system 100 (e.g., from the vehicle). For example, while the vehicle is turned off and the memory device 110 is in an idle state, the user may remove the memory device 110 and probe the memory device 110 for information (e.g., by detecting information on a DRAM or bus, by putting the memory device 110 into a reader to read out information, or using some other technique). In some cases, the user may remove the DRAM component (e.g., from or as part of a PCB) at the memory device 110, may install an interposer with a breakout cable, and may capture DRAM traffic using a protocol analyzer. In some other cases, the user may freeze the DRAM, other memory device components, or both (e.g., using a substance to supercool the memory device 110 relatively quickly), then remove the cooled memory device 110 and probe the removed memory device 110. For example, the user may remove the DRAM ball grid array (BGA) component from the PCB, solder down the DRAM socket, and install a different DRAM in the socket. This different DRAM may be programmed with data during operation of the vehicle. After the memory device enters a lower power mode such as a sleep mode (e.g., persisting data in RAM), the user may supercool the DRAM (e.g., with freeze spray) and remove the cooled DRAM. Supercooling the DRAM may cause the array to retain at least some data without performing a refresh operation for a significant period of time. The user may place the removed DRAM in another socket board that may be unlocked or have additional test equipment to read the contents of the array, searching for keys to decrypt the secure storage. The user may capture a significant quantity of information (e.g., terabytes of data) over a period of time (e.g., one or more days) while the memory device 110 is removed using one or more of these techniques.

In a second example, a user may probe the memory device 110 while the memory device 110 is in place within the system 100 (e.g., without removing the memory device 110 or a portion of the memory device 110 from the vehicle). For example, if a vehicle remains idle (e.g., parked) for a significant time period (e.g., multiple days or weeks), the user may probe the memory device 110 in place over the course of a few days or a longer duration. Similar to the first example, the user may capture a significant quantity of information (e.g., terabytes of data) over a period of time (e.g., one or more days) without removing the memory device 110 from the system 100.

In a third example, a user may install a third-party device within the system 100 (e.g., on a vehicle, for example, without the knowledge of the vehicle's owner). The third-party device may read or gather information from the memory device 110 and may transmit the information back to the user (e.g., in real-time or according to some periodicity or trigger condition). In some cases, the added third-party device may read information while the vehicle is in operation. For example, the third-party device may use a DRAM logic analyzer or another component to perform channel analysis on the memory device 110, the host device 105, or both. The third-party device may capture and transmit information to the user while the vehicle is parked, while the vehicle is operating, or a combination thereof.

As described herein, a host device 105, a memory device 110, or both may use one or more verification procedures to verify the identity of a memory component, such as a DRAM component, in the memory device 110. For example, the DRAM may be assigned a unique ID (e.g., a serial number, an encryption key, or some other uniquely identifying value for the DRAM). If the DRAM is removed and replaced, the replacement DRAM may correspond to a different unique ID than the original DRAM. As such, the host device 105 or memory device 110 may detect that the DRAM has been replaced based on a result of a verification procedure for the unique ID. Additionally or alternatively, the verification procedure may involve checking for other changes to the DRAM or the memory device 110, such as changes to temperature, voltage, speed, capacitance, or any other changes that indicate a modification to—and a potential attack on—the memory device 110. If the verification procedure determines a change to the DRAM or the memory device 110, the host device 105 may disable one or more features of the memory device 110 in order to protect information at the memory device 110. For example, the memory device 110 may lock specific functionality to protect secure information against attack, the memory device 110 may clear specific data from memory to protect against the data being stolen, the host device 105 may send a notification message to another device or an original equipment manufacturer (OEM) indicating the potential attack, or any combination thereof.

Although some examples may be described herein in terms of volatile memory such as DRAM, non-volatile memory such as ferroelectric RAM (FeRAM), or other capacitive-based memory types, it is to be understood that aspects of the teachings herein may be applied to any memory device (e.g., various types and combinations of volatile memory, non-volatile memory, or some combinations of both). Additionally, although some examples may be described herein in terms of vehicles and automotive systems, it is to be understood that the teachings herein may be applied to any system and various examples outside of the vehicle context, which is merely one example implementation.

Figure 2:
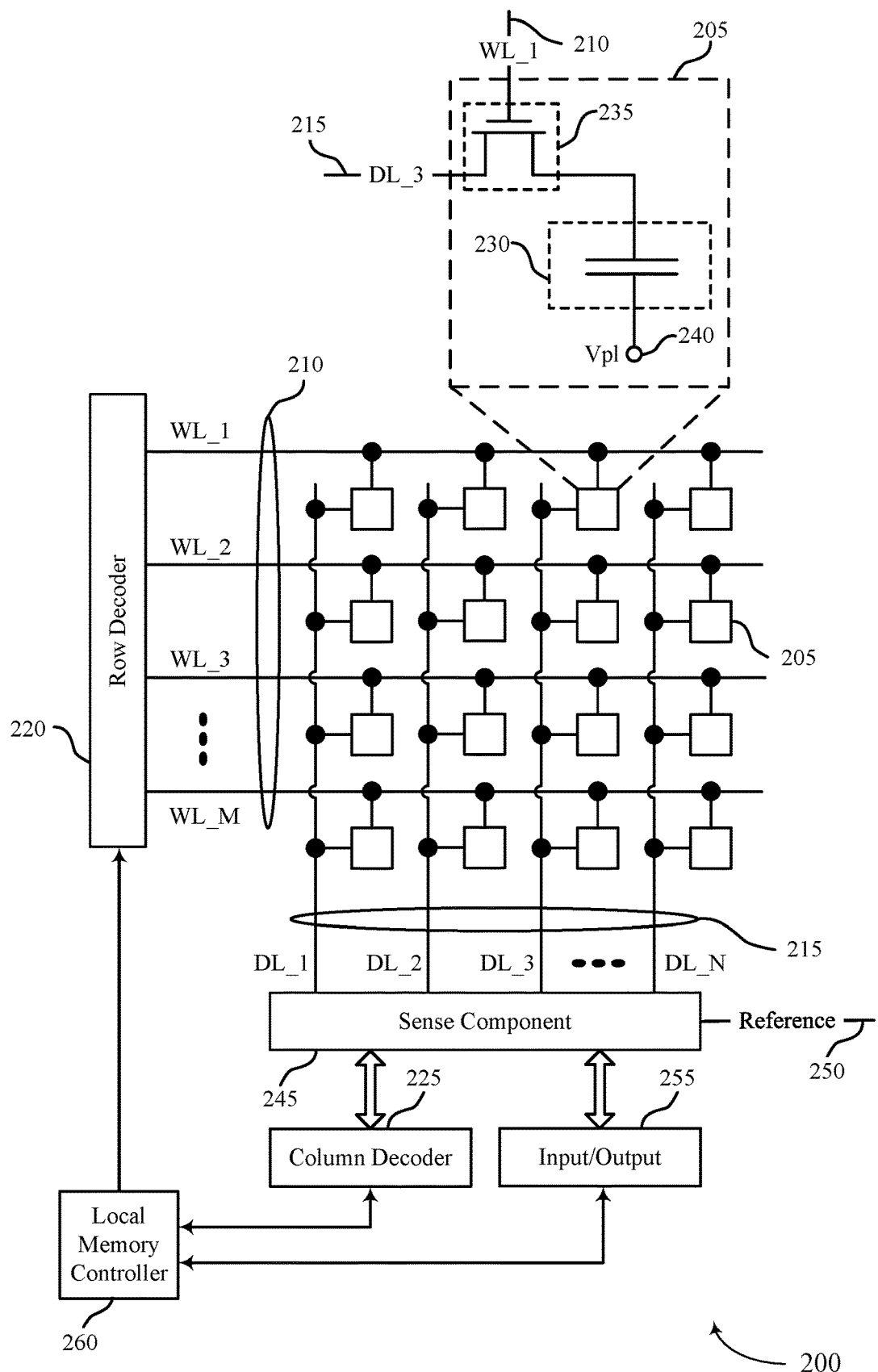
FIG. 2 illustrates an example of a memory die that supports verification of a volatile memory, such as a DRAM, using a unique ID in accordance with examples as disclosed herein.

FIG. 2 illustrates an example of a memory die 200 that supports verification of a volatile memory, such as a DRAM, using a unique ID in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205. For example, the local memory controller 260 may support one or more verification operations (e.g., attestation) for a DRAM component using a unique ID of the DRAM.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In some architectures, such as a DRAM architecture, a memory cell 205 in the memory array may include a capacitive storage element that operates as volatile memory. That is, the memory cell 205 may store a logic state while the memory array is supplied power but may not maintain storage of the logic state if the power supply is shut off (or otherwise disconnected). However, to effectively store a unique ID for the DRAM, the unique ID may be to be stored in non-volatile memory to ensure that the unique ID persists, for example, even when power to the DRAM is shut off or is reduced.

In a first example, the memory die 200 may include one or more fuses (e.g., fuse elements) for storing information. The fuses may store pre-written information associated with settings (e.g., trims) related to the DRAM product or specification. Specific fuse addresses may store specific information related to the DRAM. In some cases, the fuses may be examples of one-time-programmable (OTP) fuse elements, where a fuse may be set to a value and will not support modification of the set value. During production of the memory die 200 (or during an initial setup of the memory die 200), a host device, a memory device, or another device or entity may program one or more fuses to store values (e.g., bit values) indicating the unique ID for the DRAM. In some cases, a specific set of fuse addresses may be allocated for storing the DRAM unique ID. The fuses may maintain storing the unique ID of the DRAM even if power to the DRAM is shut off or otherwise reduced. The memory device may read the information from the fuses to determine the DRAM unique ID for verification procedures.

In a second example, the memory die 200 (or multiple memory dies 200) may include a first set of memory cells 205 supporting volatile memory and a second set of memory cells 205 supporting non-volatile memory. In some cases, the first set of memory cells 205 may be significantly larger (e.g., in quantity) than the second set of memory cells 205. The memory die 200 (or multiple memory dies 200), such as the DRAM, may use the first set of memory cells 205 to write and read data from a host device, and may use the second set of memory cells 205 for a subset of information to persist during power off states. The memory device may write the unique ID of the DRAM to the second set of memory cells 205 supporting non-volatile memory.

In a third example, the memory die 200 (or multiple memory dies 200) may store the unique ID for the DRAM external to the DRAM. For example, the memory device may include non-volatile memory (e.g., at the local memory controller 260 or elsewhere) external to the DRAM that may store the unique ID and a correlation between the unique ID and the DRAM. In some cases, this correlation may be affected if the DRAM is removed from the memory device, such that the memory device may detect that the unique ID stored in non-volatile memory at the memory device no longer corresponds to a DRAM currently installed at the memory device.

Figure 3:
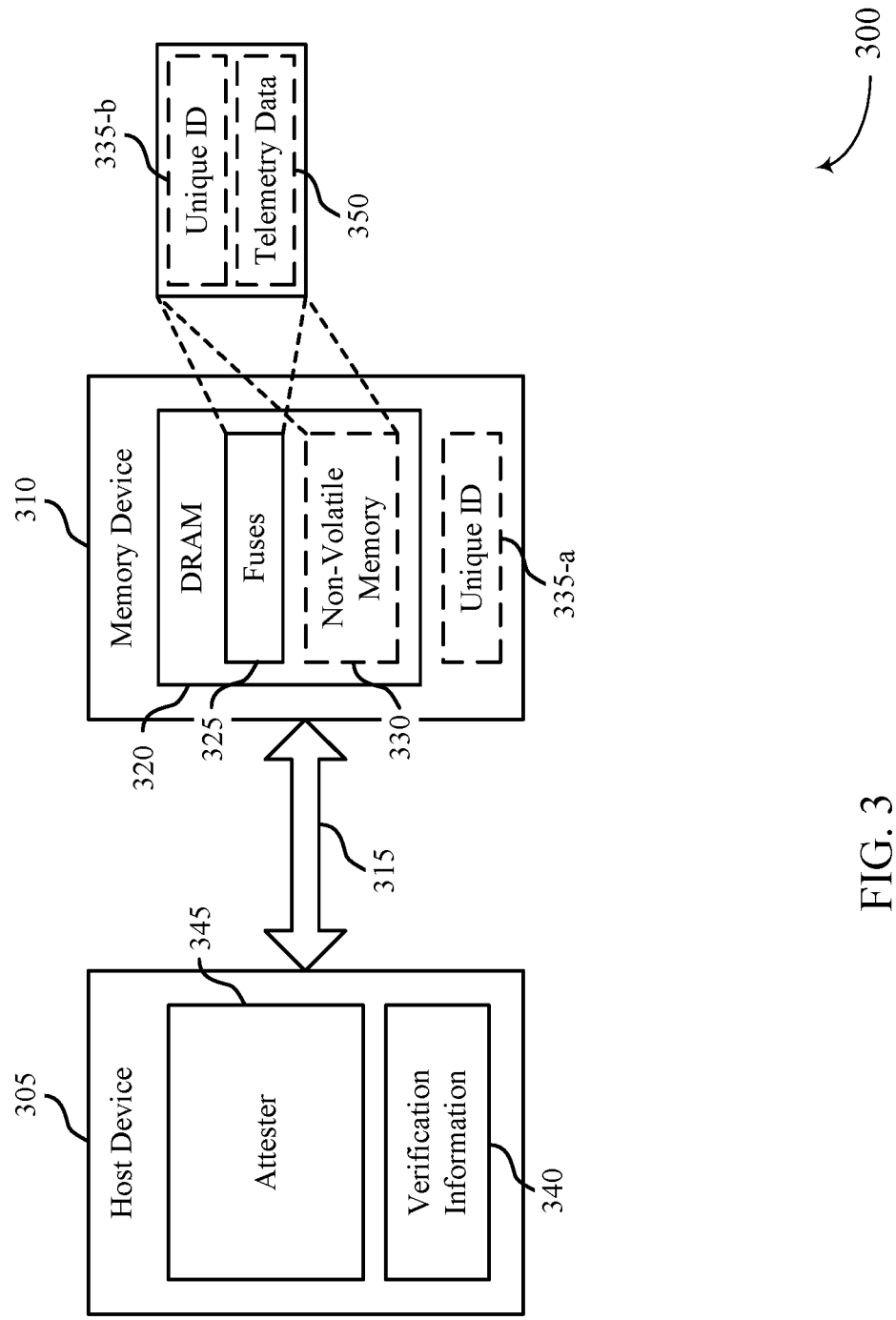
FIG. 3 illustrates an example of a system that supports verification of a volatile memory, such as a DRAM, using a unique ID in accordance with examples as disclosed herein.

FIG. 3 illustrates an example of a system 300 that supports verification of a volatile memory, such as a DRAM, using a unique ID in accordance with examples as disclosed herein. The system 300 may be an example of a system 100 as described with reference to FIG. 1. For example, the system 300 may be an example of an automotive system, such as a vehicle, or another system including a DRAM 320. The system 300 may include a host device 305 and a memory device 310, which may be examples of the corresponding devices described with reference to FIG. 1. The host device 305 may be coupled with the memory device 310, such that the host device 305 may issue signals to and receive signals from the memory device 310 over one or more channels 315, such as the channels 115 described with reference to FIG. 1. The host device 305 and the memory device 310 may use a unique ID 335 for a DRAM 320 and an attester 345 to verify the identity of the DRAM 320 and detect potential attacks on the memory device 310.

In some cases, the system 300 may be an example of an automotive system (e.g., a vehicle), where the system 300 may include an attester 345 to verify that the memory device 310 (e.g., the DRAM 320 component of the memory device 310) is not modified or removed from the automotive system, for example, while the vehicle is parked or otherwise powered down. Alternatively, the system 300 may be any other platform, such as a wireless device or any other device including a central processing unit (CPU). For example, a device receiving a memory device 310 or DRAM 320 from a supplier may verify whether the DRAM 320 is being received through a secure supply chain using one or more verification procedures and a unique ID 335 for the DRAM 320. The unique ID 335 for the DRAM 320 may allow a customer receiving the DRAM 320 to verify the validity of the DRAM 320 before writing sensitive information to the DRAM 320.

The memory device 310 may store a unique ID 335 corresponding to the DRAM 320 in non-volatile memory. In some examples, as described with reference to FIG. 2, the memory device 310 may store a unique ID 335-a at the memory device 310 external to the DRAM 320. Additionally or alternatively, as described with reference to FIG. 2, the memory device 310 may store a unique ID 335-b in non-volatile memory of the DRAM 320, such as in a set of fuses 325 or in other non-volatile memory 330 of the DRAM 320. For example, a portion of the memory array of the DRAM 320 may be configured to store specific information (e.g., identity information related to the DRAM 320, such as the unique ID 335-b) in non-volatile memory 330, while the rest of the memory array may store data in volatile memory. Additionally or alternatively, the memory device 310 may program one or more fuses 325 (e.g., fuse elements) of the memory array of the DRAM 320 to store the unique ID 335-b. In some cases, the fuses 325 may be programmed with the unique ID 335-b during production (e.g., prior to operating the DRAM 320 in the field). In some other cases, the fuses 325 may be blank when shipped to a customer, and the customer may program the fuses 325 with a unique ID 335-b (e.g., using a host device 305, a customer-specific unique ID generation scheme, or both). In some examples, the customer may receive or determine a key pair, such as a public-private key pair, for programming the fuses 325. The one or more fuses 325 may be programmed to store the private key of the key pair, while a host device 305 may store the public key for verification purposes (e.g., as verification information 340). Alternatively, the one or more fuses 325 may be programmed with the public key and the host device 305 may use the private key of the key pair for DRAM ID verification. As such, in some cases, the unique ID 335 may be an example of a key of a key pair.

The host device 305 may include an attester 345 for performing one or more procedures for verification of the identity of the DRAM 320. The attester 345 may use the verification information 340 stored at the host device 305 as a root of trust (RoT) to verify the identity of the DRAM 320. The attester 345 may additionally or alternatively test for other changes to the memory device 310, the DRAM 320, or both. The attester 345 may be an example of circuitry, logic, or both that supports performing verification procedures. In some cases, the attester 345 may be fully implemented in hardware instead of firmware to avoid the host device 305, the memory device 310, or both performing additional verification procedures to ensure that firmware is not modified (e.g., in addition to checking that the hardware is not modified). The attester 345 may perform attestation procedures for the DRAM 320 (e.g., procedures for verification of the identity of the DRAM 320) to prove the identity of the DRAM 320 prior to accessing sensitive information at the DRAM 320 or sending sensitive information to the DRAM 320.

An example procedure for establishing attestation is described herein. In some cases, to set up the host device 305 and the memory device 310 for attestation, the system 300 may perform a set of initial procedures. The host device 305, the memory device 310, or another provisioning entity may create uniqueness for the DRAM 320 by programming an identifying secret unique to the DRAM 320 into protected persistent storage (e.g., non-volatile memory at the DRAM 320 or the memory device 310).

The host device 305, the memory device 310, or the other provisioning entity may initialize an identity key using the unique identifying secret of the DRAM 320. For example, the identity key may be a public-private key pair generated by or injected into the memory device 310. In some cases, the public key may be used for additional certification of the DRAM 320. For example, the provisioning entity may receive the identity public key and may provide a provisioner's certificate in response (e.g., based on verifying that the identity public key is unique to the DRAM 320). The memory device 310, the host device 305, or both may receive and install the certificate from the provisioner, and, in some cases, the host device 305 may record the identity public key at the attester 345 (e.g., as part of the verification information 340). The host device 305, the memory device 310, or the other provisioning entity may additionally create an attestation key using the unique identifying secret of the DRAM 320 and may sign the attestation key using the provisioner's certificate.

The host device 305 may further establish ownership or validity of the DRAM 320 by initially verifying the identity of the DRAM 320 and recording an owner's certificate for the DRAM 320 at the attester 345. The host device 305 may use the attestation key (e.g., signed with the provisioner's certificate, the owner's certificate, or both) as the verification information 340 for verifying the identity of the DRAM 320. Once the unique ID 335 and the verification information 340 is set up, the host device 305 may verify the identity of the DRAM 320 and may deploy the DRAM 320 for normal operations.

The host device 305 and the memory device 310 may perform a handshake procedure to perform attestation (e.g., when the DRAM 320 is deployed and operating). For example, the attester 345 of the host device 305 and the DRAM 320 of the memory device 310 may communicate signaling over one or more channels 315 to support one or more verification procedures. In some cases, the handshake procedure may involve the memory device 310 transmitting signaling indicative of the unique ID 335 to the host device 305 and the host device 305 (e.g., at the attester 345) verifying the unique ID 335 using the verification information 340.

For example, the host device 305 may also store the unique ID 335 in non-volatile memory at the host device 305 as verification information 340. If the host device 305 receives a unique ID 335 corresponding to a DRAM 320 from the memory device 310, the host device 305 may compare the received unique ID 335 to the unique ID stored at the host device 305. If the unique IDs 335 match, the host device 305 may operate normally.

However, if the unique IDs 335 do not match, the host device 305 may determine that the DRAM 320 at the memory device 310 has been modified (e.g., tampered with, removed and replaced). In response, the host device 305 may disable one or more features of the memory device 310. For example, the host device 305 may transmit signaling to the memory device 310 to disable one or more features of the memory device 310 to protect data at the memory device 310. Disabling the one or more features may involve the memory device 310 flushing data from memory cells, locking access to one or more memory cells, disabling performing one or more commands (e.g., access commands), or any combination thereof. In this way, the memory device 310 may protect data from attack if a change to the DRAM 320 is detected by the attester 345 based on the unique ID 335. Additionally or alternatively, the host device 305 may monitor the DRAM 320 to determine the nature of the attack on the DRAM 320 and may log information related to the attack. Once enough information has been logged (e.g., the monitoring satisfies a monitoring threshold), the host device 305 may lock access to the DRAM 320 and may report the monitoring information, historical information, or both to another device or entity (e.g., an OEM).

The one or more procedures for verification may involve additional or alternative procedures for attestation of the DRAM 320, the memory device 310, or both. For example, the system 300 may perform a verification procedure to determine whether one or more aspects of the memory device 310 have changed. The memory device 310 may track and store telemetry data 350, such as data related to a temperature of the DRAM 320, a voltage of the DRAM 320, a speed of the DRAM 320, a capacitance of the channel 315, a configuration of the memory array at the DRAM 320, or any combination of this or other data related to the DRAM 320, the memory device 310, or both. The memory device 310 may store the telemetry data 350 in volatile memory at the DRAM 320 or in non-volatile memory 330 at the DRAM 320 or elsewhere in the memory device 310 (e.g., at a local memory controller). In some cases, to protect the telemetry data 350 from attackers changing this data to hide attacks, the memory device 310 may securely encrypt the telemetry data 350, for example, using an encryption key based on the unique ID 335 of the DRAM 320. As such, an attacker may fail to decrypt the telemetry data 350, and a replacement DRAM 320 may fail to encrypt the data in the same way as the removed DRAM 320 (e.g., due to the different DRAM unique IDs 335), protecting this telemetry data 350 against modification by an attacker.

In some examples, the memory device 310 may transmit signaling indicative of the telemetry data 350 to the host device 305 for use in one or more verification procedures (e.g., at the attester 345). For example, the memory device 310 (e.g., the DRAM 320) may report one or more parameters to the host device 305, such as the temperature of the DRAM 320, the voltage of the DRAM 320, the speed of the DRAM 320, the capacitance of the channel 315, a detected bit flip in the DRAM 320, an error (e.g., an error correction code (ECC) error) detected in the DRAM 320, a configuration of the memory array at the DRAM 320, or any combination of these or other parameters. In some cases, the memory device 310 may report raw values for these parameters. In some other cases, the memory device 310 may report changes to these parameters. The reporting may be triggered by the memory device 310 or the DRAM 320, or the host device 305 may transmit signaling to the memory device 310 indicative of a request for such reporting. The request may be a specific request message or request command supported by the host device 305 and the memory device 310 or may be performed by other signaling, such as ready/busy signaling. In some examples, the memory device 310 may transmit signaling indicating that telemetry data 350 is available for the host device 305 to retrieve, and the host device 305 may access a specific register of the DRAM 320 storing the telemetry data 350. For example, the DRAM 320 may include a specific range of addresses or specific portion of a memory array configured for storing telemetry data 350 for attestation. In some examples, such addresses may be accessible by the attester 345 for a verification procedure but may otherwise be inaccessible by a host device 305 or other device. The host device 305, the memory device 310, or a combination of the two may include the logic operable to retrieve and analyze the telemetry data 350.

The host device 305 may use the received parameters (e.g., raw values or change values) to determine one or more changes in conditions at the DRAM 320. The host device 305 may use this information to potentially detect modifications to the memory device 310 or the DRAM 320. For example, if the DRAM 320 has been replaced or the memory device 310 has been modified (e.g., by adding an interposer coupled with the memory device, by adding cabling to the memory device, by adding a socket to the memory device, by removing the DRAM 320 from the memory device), one or more parameters associated with the DRAM 320 or the memory device 310 may change. The host device 305 may trigger one or more actions at the memory device 310 to protect data at the memory device 310 in response to detecting a modification to the DRAM 320 or the memory device 310.

In some cases, the host device 305, the memory device 310, or both may determine specific portions of the DRAM 320 that have been affected by an attack. For example, a first portion of the memory array of the DRAM 320 may be disturbed by an attack, while a second portion of the memory array of the DRAM 320 may be unaffected. The host device 305, the memory device 310, or both may detect the effected portion based on where errors occur in the DRAM (e.g., which addresses of the memory array include ECC errors, bit flip errors, or other errors). The host device 305, the memory device 310, or both may determine a range of addresses potentially affected by an attack and may perform one or more protective actions for this range of addresses. For example, the memory device 310 may delete the data written to this range of addresses or may lock access to this range of addresses.

The host device 305, the memory device 310, or both may trigger the verification procedure for the DRAM 320 (e.g., an attestation procedure). In some examples, the host device 305 may trigger the verification procedure upon boot up. For example, if the host device 305, the memory device 310, or both switch from a first power mode (e.g., a low power mode or sleep mode) to a second power mode (e.g., a high power mode or awake mode), the host device 305, the memory device 310, or both may trigger the verification procedure for the DRAM 320. Such a trigger may allow the system 300 to verify that an attacker has not switched DRAMs 320 at the memory device 310 while the system 300 is powered down or otherwise in a sleep mode (e.g., if the system 300 is an automotive system, while the vehicle is parked).

Additionally or alternatively, the host device 305, the memory device 310, or both may trigger the verification procedure according to a periodicity in time or a schedule (e.g., an aperiodic schedule). In some examples, the system 300 may support other trigger events to trigger the verification procedure for the DRAM 320. For example, other trigger events may include detecting a change at the memory device 310, such as a significant change in temperature (e.g., the temperature changed by a threshold amount within a threshold time window) or some other change. In some cases, the host device 305 may configure one or more triggers for performing a procedure for verification of the identity of a DRAM 320.

Figure 4:
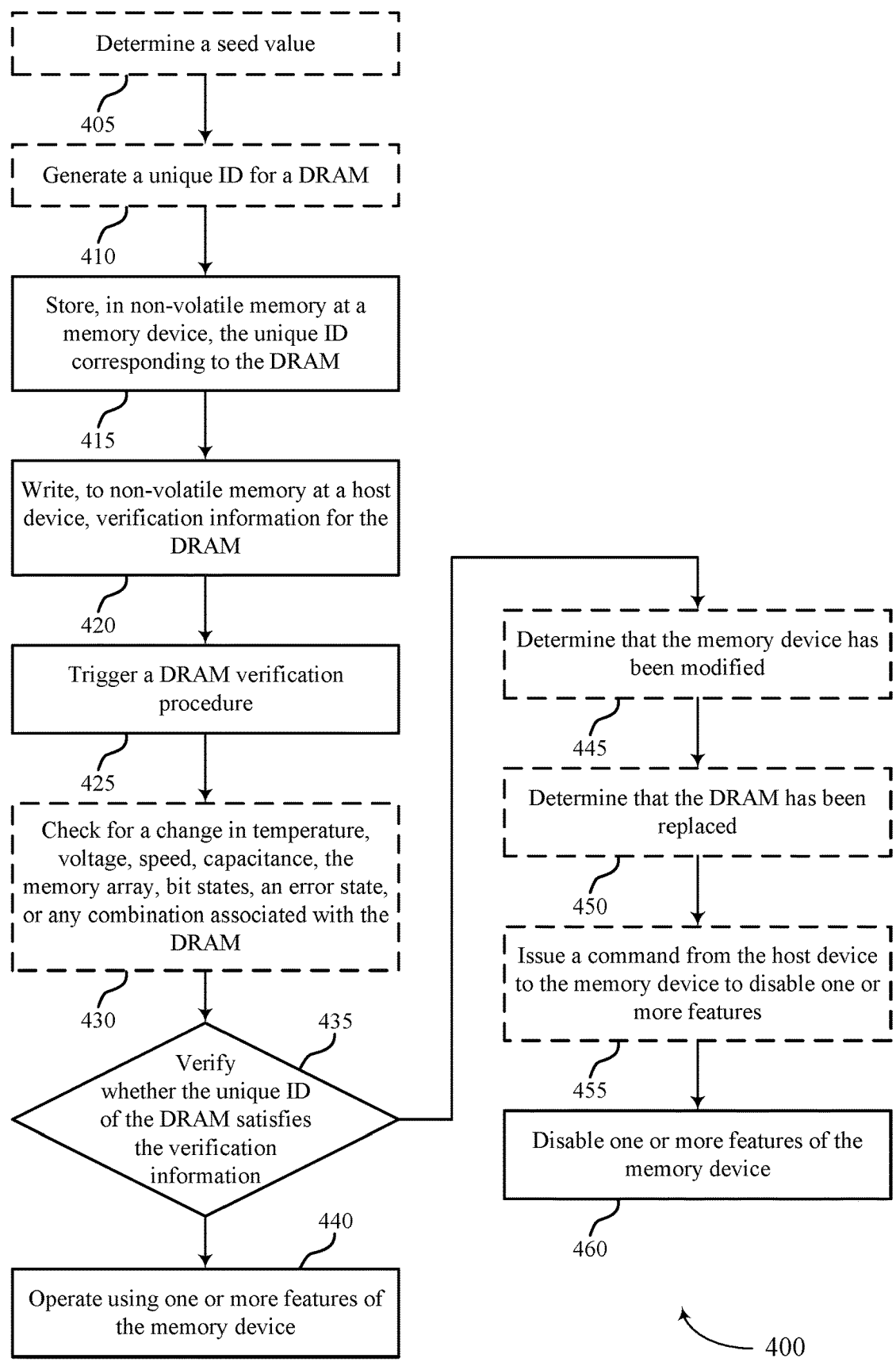
FIG. 4 illustrates an example of a process flow that supports verification of a volatile memory, such as a DRAM, using a unique ID in accordance with examples as disclosed herein.

FIG. 4 illustrates an example of a process flow 400 that supports verification of a volatile memory, such as a DRAM, using a unique ID in accordance with examples as disclosed herein. The process flow 400 may be performed by devices described with reference to FIGS. 1 through 3. For example, a host device—such as a host device 105 or a host device 305—may perform one or more aspects of the process flow 400, and a memory device—such as a memory device 110 or a memory device 310—may perform one or more other aspects of the process flow 400. The host device may be coupled with the memory device, and the host device and memory device may both be associated with (e.g., components of) a vehicle or another system. The process flow 400 may support detection of a memory device attack based on detecting a change to a DRAM according to a unique ID of the DRAM. Alternative examples of the following may be implemented, where some steps are performed in a different order or not at all. Additionally, some steps may include additional features not mentioned below.

Aspects of the process flow 400 may be implemented by a controller, among other components (e.g., a host device controller, an external memory controller, a memory device controller, or some combination thereof). Additionally or alternatively, aspects of the process flow 400 may be implemented by logic coupled with a host device or a memory device. For example, the logic may be operable to cause an apparatus to perform the operations of the process flow 400.

A memory device may store a unique ID corresponding to a DRAM installed at the memory device. In some examples, at 405, the memory device may determine a seed value for generating the unique ID for the DRAM. In some cases, the memory device may generate the seed value, for example, using a random bit generator. In some other cases, the memory device may receive the seed value (e.g., signaling indicative of the seed value) from a host device or other device or entity. In some examples, at 410, the memory device may generate the unique ID for the DRAM. For example, the memory device may input the seed value to a key generation function to determine a unique ID for the DRAM. The key generation function and seed value may ensure uniqueness across DRAMs. Alternatively, the memory device may support unique IDs for different customers, as opposed to different DRAMs. The unique ID may follow one or more industry standards or specifications for uniqueness, such as the National Institute of Standards and Technology (NIST) standards. The unique ID may include a quantity of bits to ensure uniqueness to a threshold certainty.

At 415, the memory device may store, in non-volatile memory of the memory device, the unique ID corresponding to the DRAM (e.g., the DRAM component of the memory device). As described herein, the memory device may generate and store the unique ID. Alternatively, the unique ID may be injected into the memory device during provisioning, and the memory device may store the received unique ID for the DRAM. The memory device may store the unique ID of the DRAM in one or more fuse elements, a portion of non-volatile DRAM memory, or non-volatile memory of the memory device external to the DRAM (e.g., in a memory device controller or other memory resources coupled with the memory device, the DRAM, or both), as described with reference to FIGS. 2 and 3.

At 420, the host device may write verification information to non-volatile memory at the host device. For example, the memory device may transmit signaling indicative of the unique ID to the host device, and the host device may determine the verification information based on the received unique ID. In some cases, the verification information may include the unique ID for the DRAM. In some other cases, the verification information may be a key or other value generated based on the unique ID and supporting verification of the unique ID for the DRAM.

At 425, a DRAM verification procedure may be triggered. In some examples, the host device, the memory device, or both may operate according to a first power mode and may transition to a second power mode from the first power mode, where the host device, the memory device, or both use relatively more power in the second power mode than in the first power mode. Transitioning from the first power mode to the second power mode may trigger a procedure for verification of the identity of the DRAM component of the memory device (e.g., boot up may be a trigger event for the verification procedure). In some other examples, the host device, the memory device, or both may trigger performing the procedure for verification based on a periodicity or other schedule. In yet some other examples, the host device, the memory device, or both may trigger performing the procedure for verification based on detecting a change to the memory device or DRAM, such as a temperature change satisfying a temperature change threshold (e.g., the temperature of the DRAM dropped a threshold quantity of degrees within a threshold time period, potentially indicating supercooling of the DRAM during an attack).

At 430, the memory device may check for a change to the DRAM. For example, the memory device may store telemetry data, as described with reference to FIG. 3, and may use the telemetry data to determine whether a change has affected the DRAM (e.g., a change that satisfies a change threshold). In some examples, the memory device may check for a change in temperature of the DRAM, a change in voltage of the DRAM, a change in the speed of the DRAM, a change in a channel capacitance between the DRAM and the host device, a change to the memory array of the DRAM, a change to the state of a bit written to a memory cell (e.g., a bit flip), an error state associated with the DRAM (e.g., an ECC error, a single-bit error), or any combination of these or other changes to the DRAM. In some cases, detecting a change to the DRAM may trigger the verification procedure. In some other cases, the memory device may check for changes to the DRAM as part of the verification procedure and may transmit signaling to the host device indicating any detected changes to the DRAM during the verification procedure. In yet some other cases, the memory device may transmit signaling indicative of telemetry data to the host device (e.g., encrypted using the unique ID of the DRAM), and the host device may use the telemetry data (e.g., decrypted using a verified unique ID of the DRAM) to determine whether there has been a change to the DRAM.

The memory device may transmit signaling indicative of the unique ID of the DRAM to the host device as part of the verification procedure. At 435, the host device may verify whether the received unique ID of the DRAM satisfied the verification information stored at the host device. For example, if the host device stores the unique ID value, the host device may compare the received unique ID value to the stored unique ID value to determine whether the DRAM component of the memory device has changed. Additionally or alternatively, the host device may perform more complex attestation procedures to verify the identity of the DRAM component of the memory device, determine whether a change has affected the memory device, or both.

If the host device determines that the memory device has not been changed (e.g., the identity of the DRAM component is validated, no significant changes to the DRAM or memory device are detected), at 440, the host device and the memory device may operate as normal. For example, the memory device may operate using one or more features of the memory device that allow access to data written to the DRAM.

If the host device determines that the memory device has been changed, at 445, the host device, the memory device, or both may determine that the memory device has been modified. For example, based on telemetry data and the verification procedure, the host device may determine a change to the DRAM (e.g., a change to the memory device) indicating a potential attack on the DRAM. A change to the memory device may be based on an addition of an interposer coupled with the memory device, an addition of cabling to the memory device, an addition of a socket to the memory device, or any combination thereof. Additionally or alternatively, if the received unique ID of the DRAM does not match the unique ID stored as verification information at the host device, the host device may determine that the DRAM component of the memory device has been replaced with a different DRAM component at 450.

At 455, the host device may issue a command to the memory device to disable one or more features of the memory device in response to the verification procedure. For example, the host device may transmit signaling indicative of the command to the memory device if the host device determines that the memory device may potentially have been attacked (e.g., the DRAM removed, the DRAM replaced, components added to the memory device). At 460, the memory device may disable one or more features of the memory device (e.g., in response to the command). In some examples, disabling the one or more features may involve the memory device locking access to a set of data written to memory cells. In some other examples, disabling the one or more features may involve the memory device deleting data from one or more memory cells. Additionally or alternatively, disabling the one or more features may involve the memory device deleting one or more encryption keys, deleting one or more address maps, deactivating one or more commands, or any combination thereof to protect information against potential attackers. In some examples, the host device may transmit a notification of the attack, the disabled features, or both to another device or entity, such as a device associated with an OEM.

Figure 5:
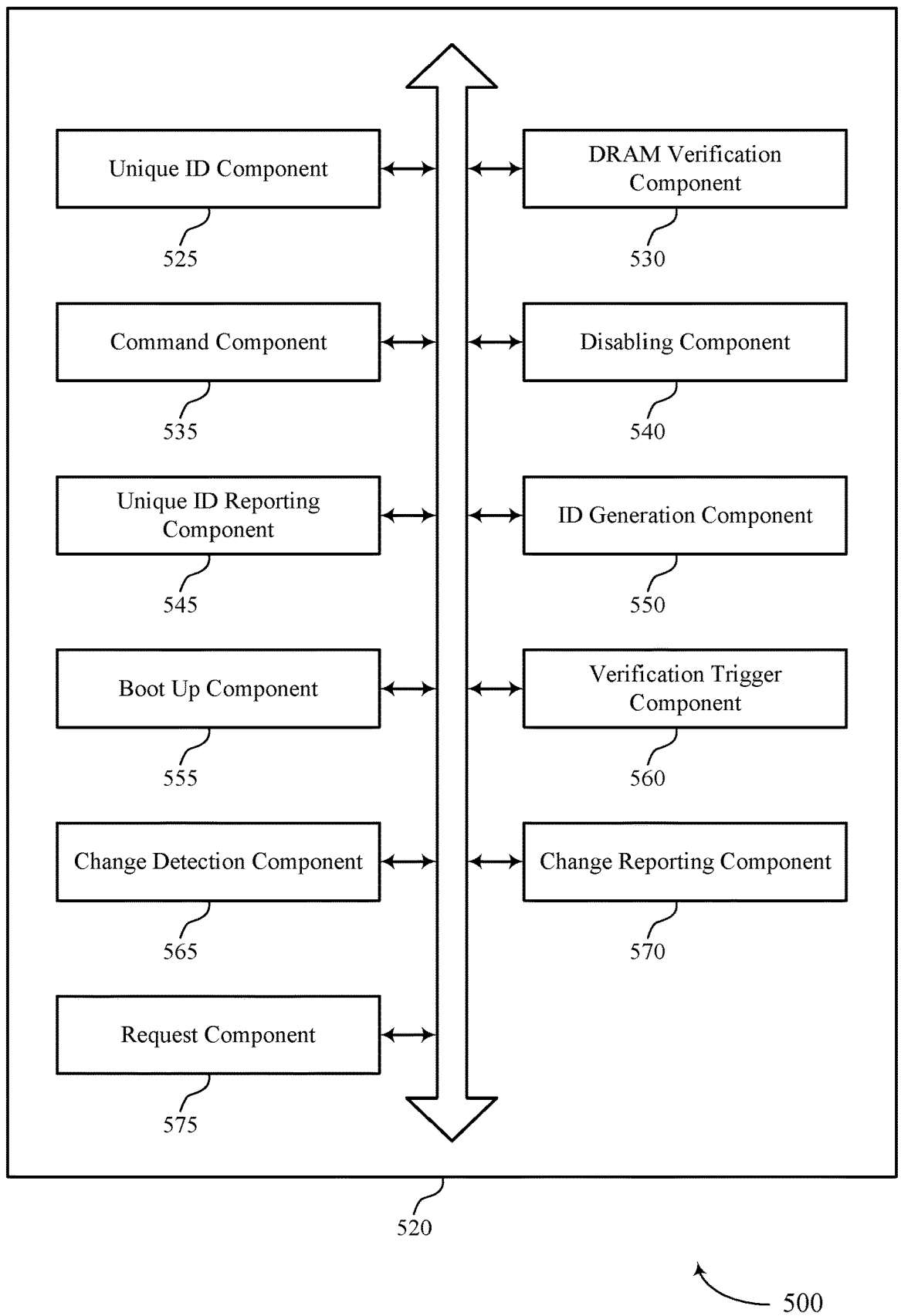
FIG. 5 shows a block diagram of a memory device that supports verification of a volatile memory, such as a DRAM, using a unique ID in accordance with examples as disclosed herein.

FIG. 5 shows a block diagram 500 of a memory device 520 that supports verification of a volatile memory, such as a DRAM, using a unique ID in accordance with examples as disclosed herein. The memory device 520 may be an example of aspects of a memory device as described with reference to FIGS. 1 through 4. The memory device 520, or various components thereof, may be an example of means for performing various aspects of verification of a DRAM using a unique ID as described herein. For example, the memory device 520 may include a unique ID component 525, a DRAM verification component 530, a command component 535, a disabling component 540, a unique ID reporting component 545, an ID generation component 550, a boot up component 555, a verification trigger component 560, a change detection component 565, a change reporting component 570, a request component 575, or any combination thereof. Each of these components may communicate, directly or indirectly, with one another (e.g., via one or more buses).

The unique ID component 525 may be configured as or otherwise support a means for storing, in non-volatile memory of a memory device, a unique ID corresponding to a DRAM component of the memory device. The DRAM verification component 530 may be configured as or otherwise support a means for performing a procedure for verification of an identity of the DRAM component of the memory device based at least in part on the unique ID. The command component 535 may be configured as or otherwise support a means for receiving, at the memory device and from a host device, signaling indicative of a command to be performed based at least in part on a result of the procedure for verification of the identity of the DRAM component. The disabling component 540 may be configured as or otherwise support a means for disabling one or more features of the memory device based at least in part on the command to be performed.

In some examples, the unique ID reporting component 545 may be configured as or otherwise support a means for transmitting, to the host device, second signaling indicative of the unique ID corresponding to the DRAM component, where performing the procedure for verification includes transmitting the second signaling.

In some examples, the ID generation component 550 may be configured as or otherwise support a means for generating the unique ID corresponding to the DRAM component based at least in part on a seed value, where storing the unique ID corresponding to the DRAM component is based at least in part on generating the unique ID.

In some examples, the ID generation component 550 may be configured as or otherwise support a means for receiving, from the host device, third signaling indicative of the seed value, where generating the unique ID is based at least in part on receiving the third signaling.

In some examples, the unique ID component 525 may be configured as or otherwise support a means for receiving, from the host device, fourth signaling indicative of the unique ID corresponding to the DRAM component, where storing the unique ID corresponding to the DRAM component is based at least in part on receiving the fourth signaling.

In some examples, the boot up component 555 may be configured as or otherwise support a means for operating the memory device according to a first power mode. In some examples, the boot up component 555 may be configured as or otherwise support a means for transitioning the memory device to a second power mode from the first power mode, where the memory device uses more power in the second power mode than in the first power mode, and where performing the procedure for verification is based at least in part on transitioning the memory device to the second power mode.

In some examples, the verification trigger component 560 may be configured as or otherwise support a means for triggering performing the procedure for verification based at least in part on a periodicity.

In some examples, the change detection component 565 may be configured as or otherwise support a means for determining a change to a temperature of the DRAM component, a change to a voltage of the DRAM component, a change to a speed of the DRAM component, a change to a capacitance of a channel that is between the DRAM component and the host device, a change to a memory array of the DRAM component, a flipped bit written to the DRAM component, or an error associated with the DRAM component, or any combination thereof, where performing the procedure for verification is based at least in part on the determining.

In some examples, the change detection component 565 may be configured as or otherwise support a means for writing, to the DRAM component, data representative of the change to the temperature of the DRAM component, the change to the voltage of the DRAM component, the change to the speed of the DRAM component, the change to the capacitance of the channel that is between the DRAM component and the host device, the change to the memory array of the DRAM component, the flipped bit written to the DRAM component, or the error associated with the DRAM component, or any combination thereof.

In some examples, the change detection component 565 may be configured as or otherwise support a means for encrypting the data written to the DRAM component using the unique ID.

In some examples, the data is written to a set of addresses of the DRAM component allocated for storing data for verification of the identity of the DRAM component.

In some examples, the change reporting component 570 may be configured as or otherwise support a means for transmitting, to the host device, fifth signaling indicative of the change to the temperature of the DRAM component, the change to the voltage of the DRAM component, the change to the speed of the DRAM component, the change to the capacitance of the channel that is between the DRAM component and the host device, the change to the memory array of the DRAM component, the flipped bit written to the DRAM component, or the error associated with the DRAM component, or any combination thereof based at least in part on performing the procedure for verification.

In some examples, the request component 575 may be configured as or otherwise support a means for receiving, from the host device, sixth signaling indicative of a request, where the fifth signaling is transmitted in response to the sixth signaling indicative of the request.

In some examples, the verification trigger component 560 may be configured as or otherwise support a means for triggering performing the procedure for verification based at least in part on determining the change.

In some examples, the unique ID is stored at one or more fuse elements of the DRAM component.

Figure 6:
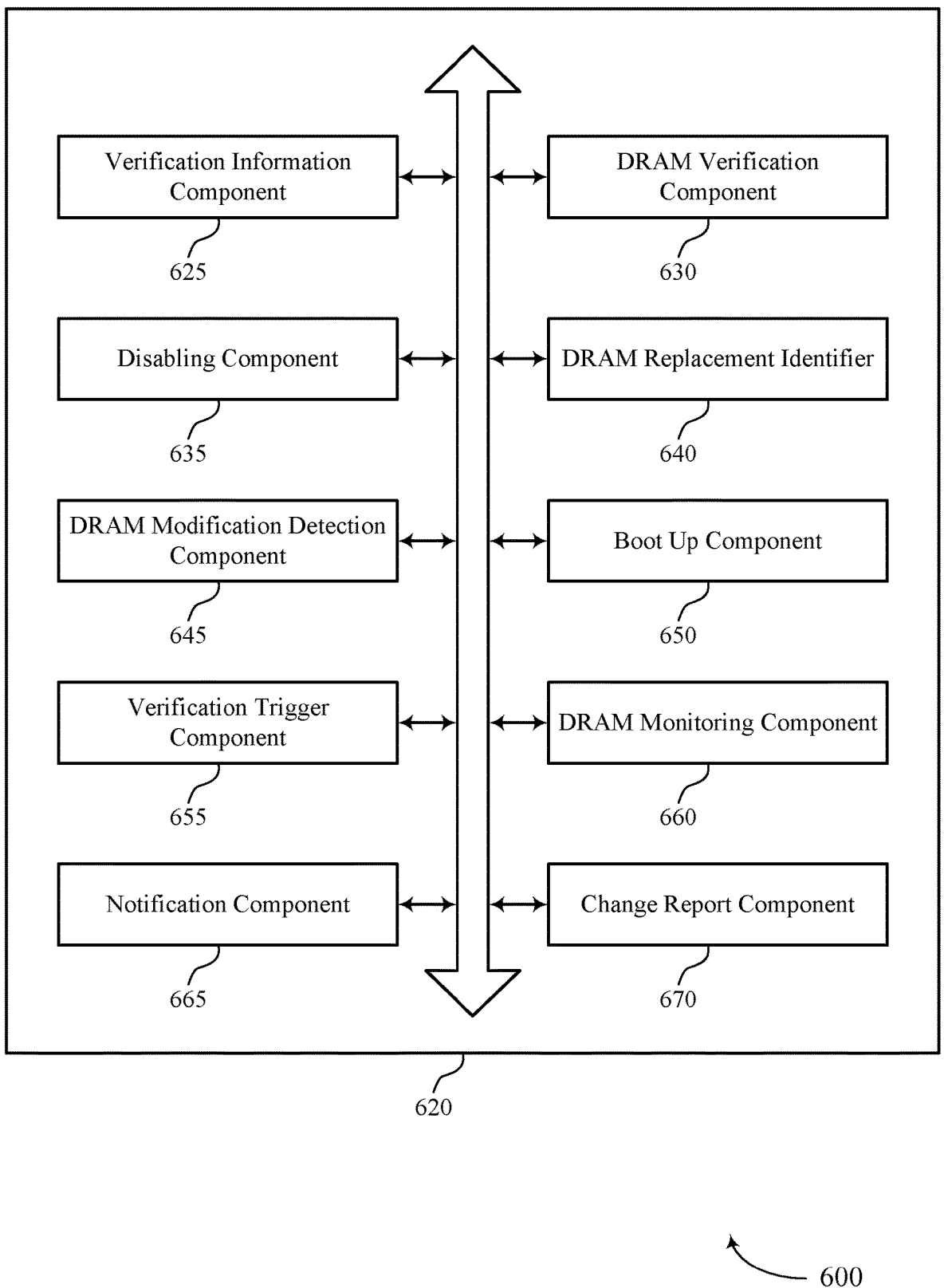
FIG. 6 shows a block diagram of a host device that supports verification of a volatile memory, such as a DRAM, using a unique ID in accordance with examples as disclosed herein.

FIG. 6 shows a block diagram 600 of a host device 620 that supports verification of a volatile memory, such as a DRAM, using a unique ID in accordance with examples as disclosed herein. The host device 620 may be an example of aspects of a host device as described with reference to FIGS. 1 through 4. The host device 620, or various components thereof, may be an example of means for performing various aspects of verification of a DRAM using a unique ID as described herein. For example, the host device 620 may include a verification information component 625, a DRAM verification component 630, a disabling component 635, a DRAM replacement identifier 640, a DRAM modification detection component 645, a boot up component 650, a verification trigger component 655, a DRAM monitoring component 660, a notification component 665, a change report component 670, or any combination thereof. Each of these components may communicate, directly or indirectly, with one another (e.g., via one or more buses).

The verification information component 625 may be configured as or otherwise support a means for writing, to non-volatile memory at a host device, information for verifying an identity of a DRAM component of a memory device, the information for verifying the identity of the DRAM component based at least in part on a unique ID corresponding to the DRAM component. The DRAM verification component 630 may be configured as or otherwise support a means for performing a procedure for verification of the identity of the DRAM component based at least in part on the information. The disabling component 635 may be configured as or otherwise support a means for disabling one or more features of the memory device based at least in part on a result of the procedure for verification.

In some examples, the DRAM replacement identifier 640 may be configured as or otherwise support a means for determining that the memory device includes a second DRAM component different than the DRAM component based at least in part on the procedure for verification, where disabling the one or more features of the memory device is based at least in part on the determining.

In some examples, the DRAM replacement identifier 640 may be configured as or otherwise support a means for receiving, from the memory device, signaling indicative of a second unique ID corresponding to the second DRAM component. In some examples, the DRAM replacement identifier 640 may be configured as or otherwise support a means for verifying that the second unique ID corresponding to the second DRAM component is different than the unique ID corresponding to the DRAM component based at least in part on the information for verifying the identity of the DRAM component, where the procedure for verification includes receiving the signaling and the verifying.

In some examples, the DRAM modification detection component 645 may be configured as or otherwise support a means for detecting a modification to the memory device based at least in part on the procedure for verification, where disabling the one or more features of the memory device is based at least in part on the detecting.

In some examples, the change report component 670 may be configured as or otherwise support a means for receiving, from the memory device, signaling indicative of a change to a temperature of the DRAM component, a change to a voltage of the DRAM component, a change to a speed of the DRAM component, a change to a capacitance of a channel that is between the DRAM component and the host device, a change to a memory array of the DRAM component, a flipped bit written to the DRAM component, or an error associated with the DRAM component, or any combination thereof, where disabling the one or more features of the memory device is based at least in part on receiving the signaling.

In some examples, the change report component 670 may be configured as or otherwise support a means for decoding the signaling using the information for verifying the identity of the DRAM component.

In some examples, the change report component 670 may be configured as or otherwise support a means for performing an operation for accessing a register of the DRAM component, where the signaling is received in response to the operation for accessing the register.

In some examples, the DRAM modification detection component 645 may be configured as or otherwise support a means for determining a portion of the DRAM component corresponding to the detected modification, where disabling the one or more features of the memory device includes disabling a set of addresses of the DRAM component corresponding to the determined portion of the DRAM component.

In some examples, detecting the modification to the memory device includes detecting an addition of an interposer coupled with the memory device, an addition of cabling to the memory device, an addition of a socket to the memory device, or a removal of the DRAM component from the memory device, or any combination thereof.

In some examples, the boot up component 650 may be configured as or otherwise support a means for operating the host device according to a first power mode. In some examples, the boot up component 650 may be configured as or otherwise support a means for transitioning the host device to a second power mode from the first power mode, where the host device uses more power in the second power mode than in the first power mode, and where performing the procedure for verification is based at least in part on transitioning the host device to the second power mode.

In some examples, the verification trigger component 655 may be configured as or otherwise support a means for triggering performing the procedure for verification based at least in part on a periodicity.

In some examples, the DRAM monitoring component 660 may be configured as or otherwise support a means for monitoring the DRAM component based at least in part on the result of the procedure for verification prior to disabling the one or more features of the memory device.

In some examples, the notification component 665 may be configured as or otherwise support a means for transmitting signaling indicative of the result of the procedure for verification to an original equipment manufacturer (OEM), or a user device, or any combination thereof based at least in part on the result of the procedure for verification.

In some examples, the information for verifying the identity of the DRAM component includes a public key of a public-private key pair associated with the unique ID corresponding to the DRAM component.

Figure 7:
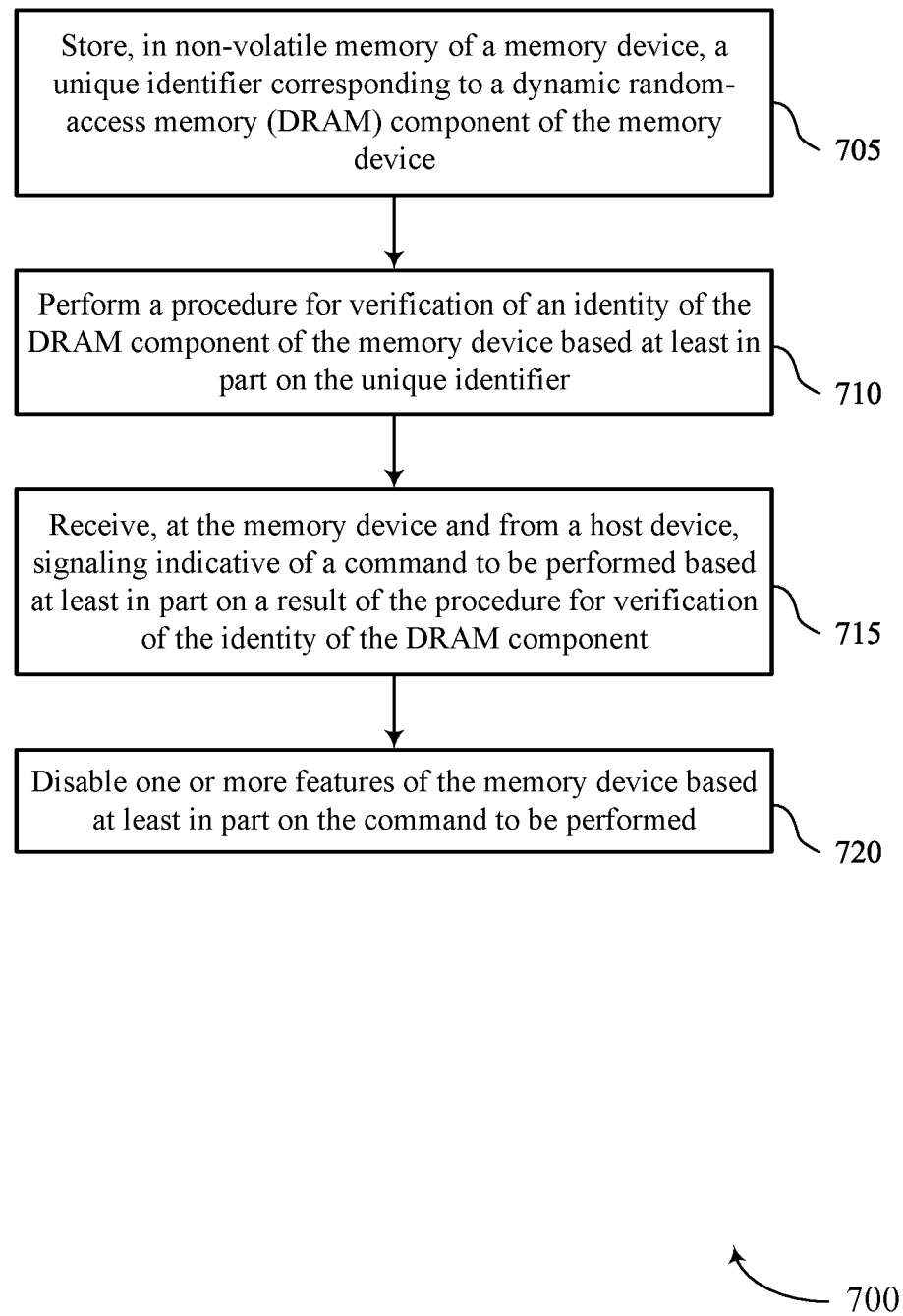
FIGS. 7 and 8 show flowcharts illustrating a method or methods that support verification of a volatile memory, such as a DRAM, using a unique ID in accordance with examples as disclosed herein.

FIG. 7 shows a flowchart illustrating a method 700 that supports verification of a volatile memory, such as a DRAM, using a unique ID in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 705, the method may include storing, in non-volatile memory of a memory device, a unique identifier corresponding to a DRAM component of the memory device. The operations of 705 may be performed in accordance with examples as disclosed herein. In some examples, aspects of the operations of 705 may be performed by a unique ID component 525 as described with reference to FIG. 5.

At 710, the method may include performing a procedure for verification of an identity of the DRAM component of the memory device based at least in part on the unique identifier. The operations of 710 may be performed in accordance with examples as disclosed herein. In some examples, aspects of the operations of 710 may be performed by a DRAM verification component 530 as described with reference to FIG. 5.

At 715, the method may include receiving, at the memory device and from a host device, signaling indicative of a command to be performed based at least in part on a result of the procedure for verification of the identity of the DRAM component. The operations of 715 may be performed in accordance with examples as disclosed herein. In some examples, aspects of the operations of 715 may be performed by a command component 535 as described with reference to FIG. 5.

At 720, the method may include disabling one or more features of the memory device based at least in part on the command to be performed. The operations of 720 may be performed in accordance with examples as disclosed herein. In some examples, aspects of the operations of 720 may be performed by a disabling component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for storing, in non-volatile memory of a memory device, a unique identifier corresponding to a DRAM component of the memory device; performing a procedure for verification of an identity of the DRAM component of the memory device based at least in part on the unique identifier; receiving, at the memory device and from a host device, signaling indicative of a command to be performed based at least in part on a result of the procedure for verification of the identity of the DRAM component; and disabling one or more features of the memory device based at least in part on the command to be performed.

Aspect 2: The apparatus of aspect 1, further including operations, features, circuitry, logic, means, or instructions, or any combination thereof for transmitting, to the host device, second signaling indicative of the unique identifier corresponding to the DRAM component, where performing the procedure for verification includes transmitting the second signaling.

Aspect 3: The apparatus of any of aspects 1 through 2, further including operations, features, circuitry, logic, means, or instructions, or any combination thereof for generating the unique identifier corresponding to the DRAM component based at least in part on a seed value, where storing the unique identifier corresponding to the DRAM component is based at least in part on generating the unique identifier.

Aspect 4: The apparatus of aspect 3, further including operations, features, circuitry, logic, means, or instructions, or any combination thereof for receiving, from the host device, third signaling indicative of the seed value, where generating the unique identifier is based at least in part on receiving the third signaling.

Aspect 5: The apparatus of any of aspects 1 through 2, further including operations, features, circuitry, logic, means, or instructions, or any combination thereof for receiving, from the host device, fourth signaling indicative of the unique identifier corresponding to the DRAM component, where storing the unique identifier corresponding to the DRAM component is based at least in part on receiving the fourth signaling.

Aspect 6: The apparatus of any of aspects 1 through 5, further including operations, features, circuitry, logic, means, or instructions, or any combination thereof for operating the memory device according to a first power mode; and transitioning the memory device to a second power mode from the first power mode, where the memory device uses more power in the second power mode than in the first power mode, and where performing the procedure for verification is based at least in part on transitioning the memory device to the second power mode.

Aspect 7: The apparatus of any of aspects 1 through 6, further including operations, features, circuitry, logic, means, or instructions, or any combination thereof for triggering performing the procedure for verification based at least in part on a periodicity.

Aspect 8: The apparatus of any of aspects 1 through 7, further including operations, features, circuitry, logic, means, or instructions, or any combination thereof for determining a change to a temperature of the DRAM component, a change to a voltage of the DRAM component, a change to a speed of the DRAM component, a change to a capacitance of a channel that is between the DRAM component and the host device, a change to a memory array of the DRAM component, a flipped bit written to the DRAM component, or an error associated with the DRAM component, or any combination thereof, where performing the procedure for verification is based at least in part on the determining.

Aspect 9: The apparatus of aspect 8, further including operations, features, circuitry, logic, means, or instructions, or any combination thereof for writing, to the DRAM component, data representative of the change to the temperature of the DRAM component, the change to the voltage of the DRAM component, the change to the speed of the DRAM component, the change to the capacitance of the channel that is between the DRAM component and the host device, the change to the memory array of the DRAM component, the flipped bit written to the DRAM component, or the error associated with the DRAM component, or any combination thereof.

Aspect 10: The apparatus of aspect 9, further including operations, features, circuitry, logic, means, or instructions, or any combination thereof for encrypting the data written to the DRAM component using the unique identifier.

Aspect 11: The apparatus of any of aspects 9 through 10, wherein the data is written to a set of addresses of the DRAM component allocated for storing data for verification of the identity of the DRAM component.

Aspect 12: The apparatus of any of aspects 8 through 11, further including operations, features, circuitry, logic, means, or instructions, or any combination thereof for transmitting, to the host device, fifth signaling indicative of the change to the temperature of the DRAM component, the change to the voltage of the DRAM component, the change to the speed of the DRAM component, the change to the capacitance of the channel that is between the DRAM component and the host device, the change to the memory array of the DRAM component, the flipped bit written to the DRAM component, or the error associated with the DRAM component, or any combination thereof based at least in part on performing the procedure for verification.

Aspect 13: The apparatus of aspect 12, further including operations, features, circuitry, logic, means, or instructions, or any combination thereof for receiving, from the host device, sixth signaling indicative of a request, where the fifth signaling is transmitted in response to the sixth signaling indicative of the request.

Aspect 14: The apparatus of any of aspects 8 through 13, further including operations, features, circuitry, logic, means, or instructions, or any combination thereof for triggering performing the procedure for verification based at least in part on the determining.

Aspect 15: The apparatus of any of aspects 1 through 14, wherein the unique identifier is stored at one or more fuse elements of the DRAM component.

Figure 8:
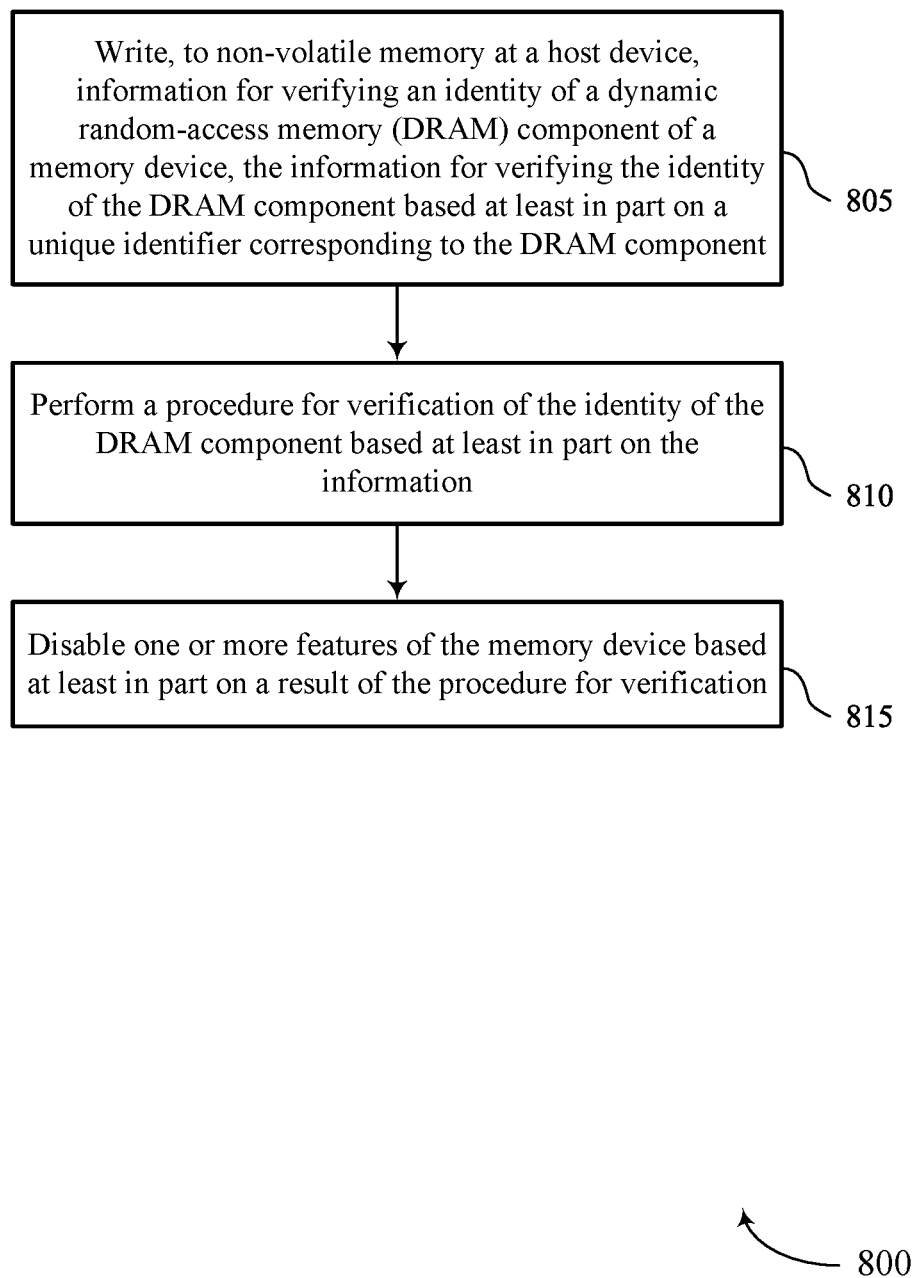

FIG. 8 shows a flowchart illustrating a method 800 that supports verification of a volatile memory, such as a DRAM, using a unique ID in accordance with examples as disclosed herein. The operations of method 800 may be implemented by a host device or its components as described herein. For example, the operations of method 800 may be performed by a host device as described with reference to FIGS. 1 through 4 and 6. In some examples, a host device may execute a set of instructions to control the functional elements of the device to perform the described functions. Additionally or alternatively, the host device may perform aspects of the described functions using special-purpose hardware.

At 805, the method may include writing, to non-volatile memory at a host device, information for verifying an identity of a DRAM component of a memory device, the information for verifying the identity of the DRAM component based at least in part on a unique identifier corresponding to the DRAM component. The operations of 805 may be performed in accordance with examples as disclosed herein. In some examples, aspects of the operations of 805 may be performed by a verification information component 625 as described with reference to FIG. 6.

At 810, the method may include performing a procedure for verification of the identity of the DRAM component based at least in part on the information. The operations of 810 may be performed in accordance with examples as disclosed herein. In some examples, aspects of the operations of 810 may be performed by a DRAM verification component 630 as described with reference to FIG. 6.

At 815, the method may include disabling one or more features of the memory device based at least in part on a result of the procedure for verification. The operations of 815 may be performed in accordance with examples as disclosed herein. In some examples, aspects of the operations of 815 may be performed by a disabling component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 16: The apparatus, including features, circuitry, logic, means, or instructions, or any combination thereof for writing, to non-volatile memory at a host device, information for verifying an identity of a DRAM component of a memory device, the information for verifying the identity of the DRAM component based at least in part on a unique identifier corresponding to the DRAM component; performing a procedure for verification of the identity of the DRAM component based at least in part on the information; and disabling one or more features of the memory device based at least in part on a result of the procedure for verification.

Aspect 17: The apparatus of aspect 16, further including operations, features, circuitry, logic, means, or instructions, or any combination thereof for determining that the memory device includes a second DRAM component different than the DRAM component based at least in part on the procedure for verification, where disabling the one or more features of the memory device is based at least in part on the determining.

Aspect 18: The apparatus of aspect 17, further including operations, features, circuitry, logic, means, or instructions, or any combination thereof for receiving, from the memory device, signaling indicative of a second unique identifier corresponding to the second DRAM component and verifying that the second unique identifier corresponding to the second DRAM component is different than the unique identifier corresponding to the DRAM component based at least in part on the information for verifying the identity of the DRAM component, where the procedure for verification includes receiving the signaling and the verifying.

Aspect 19: The apparatus of any of aspects 16 through 18, further including operations, features, circuitry, logic, means, or instructions, or any combination thereof for detecting a modification to the memory device based at least in part on the procedure for verification, where disabling the one or more features of the memory device is based at least in part on the detecting.

Aspect 20: The apparatus of aspect 19, further including operations, features, circuitry, logic, means, or instructions, or any combination thereof for receiving, from the memory device, signaling indicative of a change to a temperature of the DRAM component, a change to a voltage of the DRAM component, a change to a speed of the DRAM component, a change to a capacitance of a channel that is between the DRAM component and the host device, a change to a memory array of the DRAM component, a flipped bit written to the DRAM component, or an error associated with the DRAM component, or any combination thereof, where disabling the one or more features of the memory device is based at least in part on receiving the signaling.

Aspect 21: The apparatus of aspect 20, further including operations, features, circuitry, logic, means, or instructions, or any combination thereof for decoding the signaling using the information for verifying the identity of the DRAM component.

Aspect 22: The apparatus of any of aspects 20 through 21, further including operations, features, circuitry, logic, means, or instructions, or any combination thereof for performing an operation for accessing a register of the DRAM component, where the signaling is received in response to the operation for accessing the register.

Aspect 23: The apparatus of any of aspects 19 through 22, further including operations, features, circuitry, logic, means, or instructions, or any combination thereof for determining a portion of the DRAM component corresponding to the detected modification, where disabling the one or more features of the memory device includes disabling a set of addresses of the DRAM component corresponding to the determined portion of the DRAM component.

Aspect 24: The apparatus of any of aspects 19 through 23, wherein detecting the modification to the memory device includes detecting an addition of an interposer coupled with the memory device, an addition of cabling to the memory device, an addition of a socket to the memory device, or a removal of the DRAM component from the memory device, or any combination thereof.

Aspect 25: The apparatus of any of aspects 16 through 24, further including operations, features, circuitry, logic, means, or instructions, or any combination thereof for operating the host device according to a first power mode; and transitioning the host device to a second power mode from the first power mode, where the host device uses more power in the second power mode than in the first power mode, and where performing the procedure for verification is based at least in part on transitioning the host device to the second power mode.

Aspect 26: The apparatus of any of aspects 16 through 25, further including operations, features, circuitry, logic, means, or instructions, or any combination thereof for triggering performing the procedure for verification based at least in part on a periodicity.

Aspect 27: The apparatus of any of aspects 16 through 26, further including operations, features, circuitry, logic, means, or instructions, or any combination thereof for monitoring the DRAM component based at least in part on the result of the procedure for verification prior to disabling the one or more features of the memory device.

Aspect 28: The apparatus of any of aspects 16 through 27, further including operations, features, circuitry, logic, means, or instructions, or any combination thereof for transmitting signaling indicative of the result of the procedure for verification to an original equipment manufacturer (OEM), or a user device, or any combination thereof based at least in part on the result of the procedure for verification.

Aspect 29: The apparatus of any of aspects 16 through 28, wherein the information for verifying the identity of the DRAM component includes a public key of a public-private key pair associated with the unique identifier corresponding to the DRAM component.

It should be noted that the methods described herein describe possible implementations, and that the operations and the steps may be rearranged or otherwise modified and that other implementations are possible. Further, portions from two or more of the methods may be combined.

Another apparatus is described. The following provides an overview of aspects of the apparatus as described herein:

Aspect 30: An apparatus, including: a DRAM component including: an array of memory cells that each include capacitive storage elements; and one or more fuse elements configured to store a unique identifier corresponding to the DRAM component; and a transceiver configured to perform verification of an identity of the DRAM component with a host device based at least in part on the unique identifier corresponding to the DRAM component.

Aspect 31: The apparatus of aspect 30, where the one or more fuse elements include one or more OTP fuse elements.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, digital subscriber line (DSL), or technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from a host device, first signaling indicative of a seed value;
   generating a unique identifier corresponding to a dynamic random-access memory (DRAM) component of a memory device based at least in part on the seed value;
   storing, in non-volatile memory of the memory device, the unique identifier;
   performing a procedure for verification of an identity of the DRAM component of the memory device based at least in part on the unique identifier;
   receiving, at the memory device and from the host device, second signaling indicative of a command to disable one or more features of the memory device based at least in part on a result of the procedure for verification of the identity of the DRAM component; and
   disabling the one or more features of the memory device based at least in part on the command to disable the one or more features, wherein disabling the one or more features comprises flushing data from one or more memory cells of the memory device, locking access to the one or more memory cells, disabling performance of one or more commands, or any combination thereof.

2. The method of claim 1, further comprising:
   transmitting, to the host device, third signaling indicative of the unique identifier corresponding to the DRAM component, wherein performing the procedure for verification comprises transmitting the third signaling.

3. The method of claim 1, further comprising:
   receiving, from the host device, fourth signaling indicative of the unique identifier corresponding to the DRAM component, wherein storing the unique identifier corresponding to the DRAM component is based at least in part on receiving the fourth signaling.

4. The method of claim 1, further comprising:
   operating the memory device according to a first power mode; and
   transitioning the memory device to a second power mode from the first power mode, wherein the memory device uses more power in the second power mode than in the first power mode, and wherein performing the procedure for verification is based at least in part on transitioning the memory device to the second power mode.

5. The method of claim 1, further comprising:
   determining a change to a temperature of the DRAM component, a change to a voltage of the DRAM component, a change to a speed of the DRAM component, a change to a capacitance of a channel that is between the DRAM component and the host device, a change to a memory array of the DRAM component, a flipped bit written to the DRAM component, or an error associated with the DRAM component, or any combination thereof, wherein performing the procedure for verification is based at least in part on the determining.

6. The method of claim 5, further comprising:
   writing, to the DRAM component, data representative of the change to the temperature of the DRAM component, the change to the voltage of the DRAM component, the change to the speed of the DRAM component, the change to the capacitance of the channel that is between the DRAM component and the host device, the change to the memory array of the DRAM component, the flipped bit written to the DRAM component, or the error associated with the DRAM component, or any combination thereof.

7. The method of claim 6, further comprising:
   encrypting the data written to the DRAM component using the unique identifier.

8. The method of claim 6, wherein the data is written to a set of addresses of the DRAM component allocated for storing data for verification of the identity of the DRAM component.

9. The method of claim 5, further comprising:
   transmitting, to the host device, fifth signaling indicative of the change to the temperature of the DRAM component, the change to the voltage of the DRAM component, the change to the speed of the DRAM component, the change to the capacitance of the channel that is between the DRAM component and the host device, the change to the memory array of the DRAM component, the flipped bit written to the DRAM component, or the error associated with the DRAM component, or any combination thereof based at least in part on performing the procedure for verification.

10. The method of claim 9, further comprising:
    receiving, from the host device, sixth signaling indicative of a request, wherein the fifth signaling is transmitted in response to the sixth signaling indicative of the request.

11. The method of claim 5, further comprising:
    triggering performing the procedure for verification based at least in part on the determining.

12. The method of claim 1, wherein the unique identifier is stored at one or more fuse elements of the DRAM component.

13. A method, comprising:
    writing, to non-volatile memory at a host device, information for verifying an identity of a dynamic random-access memory (DRAM) component of a memory device, the information for verifying the identity of the DRAM component based at least in part on a unique identifier corresponding to the DRAM component;
    performing a procedure for verification of the identity of the DRAM component based at least in part on the information, wherein the verification is triggered periodically; and
    transmitting a command to disable one or more features of the memory device based at least in part on a result of the procedure for verification, wherein the one or more features comprise storage of data in one or more memory cells of the memory device, unlocked access to the one or more memory cells, performance of one or more commands, or any combination thereof.

14. The method of claim 13, further comprising:
    determining that the memory device comprises a second DRAM component different than the DRAM component based at least in part on the procedure for verification, wherein transmitting the command to disable the one or more features of the memory device is based at least in part on the determining.

15. The method of claim 14, further comprising:
    receiving, from the memory device, signaling indicative of a second unique identifier corresponding to the second DRAM component; and verifying that the second unique identifier corresponding to the second DRAM component is different than the unique identifier corresponding to the DRAM component based at least in part on the information for verifying the identity of the DRAM component, wherein the procedure for verification comprises receiving the signaling and the verifying.

16. The method of claim 13, further comprising:
detecting a modification to the memory device based at least in part on the procedure for verification, wherein transmitting the command to disable the one or more features of the memory device is based at least in part on the detecting.

17. The method of claim 16, further comprising:
receiving, from the memory device, signaling indicative of a change to a temperature of the DRAM component, a change to a voltage of the DRAM component, a change to a speed of the DRAM component, a change to a capacitance of a channel that is between the DRAM component and the host device, a change to a memory array of the DRAM component, a flipped bit written to the DRAM component, or an error associated with the DRAM component, or any combination thereof, wherein transmitting the command to disable the one or more features of the memory device is based at least in part on receiving the signaling.

18. The method of claim 17, further comprising:
decoding the signaling using the information for verifying the identity of the DRAM component.

19. The method of claim 17, further comprising:
performing an operation for accessing a register of the DRAM component, wherein the signaling is received in response to the operation for accessing the register.

20. The method of claim 16, further comprising:
determining a portion of the DRAM component corresponding to the detected modification, wherein transmitting the command to disable the one or more features of the memory device comprises disabling a set of addresses of the DRAM component corresponding to the determined portion of the DRAM component.

21. The method of claim 16, wherein detecting the modification to the memory device comprises detecting an addition of an interposer coupled with the memory device, an addition of cabling to the memory device, an addition of a socket to the memory device, or a removal of the DRAM component from the memory device, or any combination thereof.

22. The method of claim 13, further comprising:
operating the host device according to a first power mode; and
transitioning the host device to a second power mode from the first power mode, wherein the host device uses more power in the second power mode than in the first power mode, and wherein performing the procedure for verification is based at least in part on transitioning the host device to the second power mode.

23. The method of claim 13, further comprising:
monitoring the DRAM component based at least in part on the result of the procedure for verification prior to transmitting the command to disable the one or more features of the memory device.

24. The method of claim 13, further comprising:
transmitting signaling indicative of the result of the procedure for verification to an original equipment manufacturer (OEM), or a user device, or any combination thereof based at least in part on the result of the procedure for verification.

25. The method of claim 13, wherein the information for verifying the identity of the DRAM component comprises a public key of a public-private key pair associated with the unique identifier corresponding to the DRAM component.

26. An apparatus, comprising:
a dynamic random-access memory (DRAM) component removable from the apparatus, the DRAM component comprising:
an array of memory cells that each comprise capacitive storage elements; and
one or more fuse elements configured to store a unique identifier corresponding to the DRAM component; and
a transceiver configured to:
perform verification of an identity of the DRAM component with a host device by reading the unique identifier corresponding to the DRAM component from the one or more fuse elements storing the unique identifier; and
disable one or more features of a memory device associated with the DRAM component based at least in part on a result of the verification of the identity of the DRAM component, wherein disabling the one or more features comprises flushing data from one or more memory cells of the memory device, locking access to the one or more memory cells, disabling performance of one or more commands, or any combination thereof.

27. The apparatus of claim 26, wherein the one or more fuse elements comprise one or more one-time-programmable (OTP) fuse elements.

28. An apparatus, comprising:
one or more memory devices; and
logic coupled with the one or more memory devices and operable to cause the apparatus to:
receive, from a host device, first signaling indicative of a seed value;
generate a unique identifier corresponding to a dynamic random-access memory (DRAM) component of a memory device of the one or more memory devices based at least in part on the seed value;
store, in non-volatile memory of the memory device, the unique identifier corresponding to a dynamic random-access memory (DRAM) component of the memory device;
perform a procedure for verification of an identity of the DRAM component of the memory device based at least in part on the unique identifier;
receive, at the memory device and from the host device, second signaling indicative of a command to disable one or more features of the memory device based at least in part on a result of the procedure for verification of the identity of the DRAM component; and
disable the one or more features of the memory device based at least in part on the command to disable the one or more features, wherein disabling the one or more features comprises flushing data from one or more memory cells of the memory device, locking access to the one or more memory cells, disabling performance of one or more commands, or any combination thereof.

29. The apparatus of claim 28, wherein the logic is further operable to cause the apparatus to:

transmit, to the host device, third signaling indicative of the unique identifier corresponding to the DRAM component, wherein performing the procedure for verification comprises transmitting the third signaling.

30. An apparatus, comprising:
a host device; and
logic coupled with the host device and operable to cause the apparatus to:
write, to non-volatile memory at a host device, information for verifying an identity of a dynamic random-access memory (DRAM) component of a memory device, the information for verifying the identity of the DRAM component based at least in part on a unique identifier corresponding to the DRAM component;
perform a procedure for verification of the identity of the DRAM component based at least in part on the information, wherein the verification is triggered periodically; and
transmit a command to disable one or more features of the memory device based at least in part on a result of the procedure for verification, wherein the one or more features comprise storage of data from one or more memory cells of the memory device, unlocked access to the one or more memory cells, performance of one or more commands, or any combination thereof.

31. The apparatus of claim 30, wherein the logic is further operable to cause the apparatus to:
determine that the memory device comprises a second DRAM component different than the DRAM component based at least in part on the procedure for verification, wherein transmitting the command to disable the one or more features of the memory device is based at least in part on the determining.

* * * * *